(12) United States Patent
Yoo et al.

(10) Patent No.: US 7,108,332 B2
(45) Date of Patent: Sep. 19, 2006

(54) VEHICLE WHEEL HAVING A MILLED DRAIN SLOT

(75) Inventors: K. Jae Yoo, Novi, MI (US); Ruben Landeros, Gainesville, GA (US); Mike Ward, Flowery Ranch, GA (US)

(73) Assignee: Hayes Lemmerz International, Inc., Northville, MI (US)

( * ) Notice: Subject to any disclaimer, the term of this patent is extended or adjusted under 35 U.S.C. 154(b) by 119 days.

(21) Appl. No.: 10/854,810

(22) Filed: May 27, 2004

(65) Prior Publication Data

US 2005/0264094 A1 Dec. 1, 2005

(51) Int. Cl.
*B60B 27/06* (2006.01)

(52) U.S. Cl. .......................... 301/35.621; 301/63.101; 301/105.1

(58) Field of Classification Search ............ 301/63.101, 301/63.102, 63.103, 63.104, 63.105, 35.61, 301/35.62, 35.627, 35.628, 35.629, 105.1, 301/35.621
See application file for complete search history.

(56) References Cited

U.S. PATENT DOCUMENTS

| | | | |
|---|---|---|---|
| 3,009,742 A * | 11/1961 | Rabe et al. ............ | 301/35.627 |
| 3,931,871 A | 1/1976 | Martin | |
| 4,229,056 A * | 10/1980 | Renk ............................ | 384/380 |
| 4,384,387 A | 5/1983 | Pachuta | |
| 4,824,327 A | 4/1989 | Titterton, III | |
| 6,379,128 B1 | 4/2002 | Dietrich | |

* cited by examiner

*Primary Examiner*—Russell D. Stormer
(74) *Attorney, Agent, or Firm*—MacMillan, Sobanski & Todd, LLC (57) ABSTRACT

A vehicle wheel having a shallow drain slot milled into the inboard surface of the hub and extending from the wheel pilot hole to the edge of the hub.

17 Claims, 7 Drawing Sheets

VEHICLE WHEEL HAVING A MILLED DRAIN SLOT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

This invention relates in general to vehicle wheels and particular to cast vehicle wheels having a pilot hole communicating with a milled drain slot.

In the past, vehicle wheels typically have been formed entirely from steel. However, wheels formed from light weight metals, such as aluminum, magnesium and titanium, or alloys thereof, have become increasingly popular. In addition to weighing less than conventional all-steel wheels, such light weight wheels can be manufactured having a pleasing esthetic shape. Weight savings also can be achieved by attaching a wheel disc formed from a light weight metal alloy to a steel wheel rim.

Figure 1:
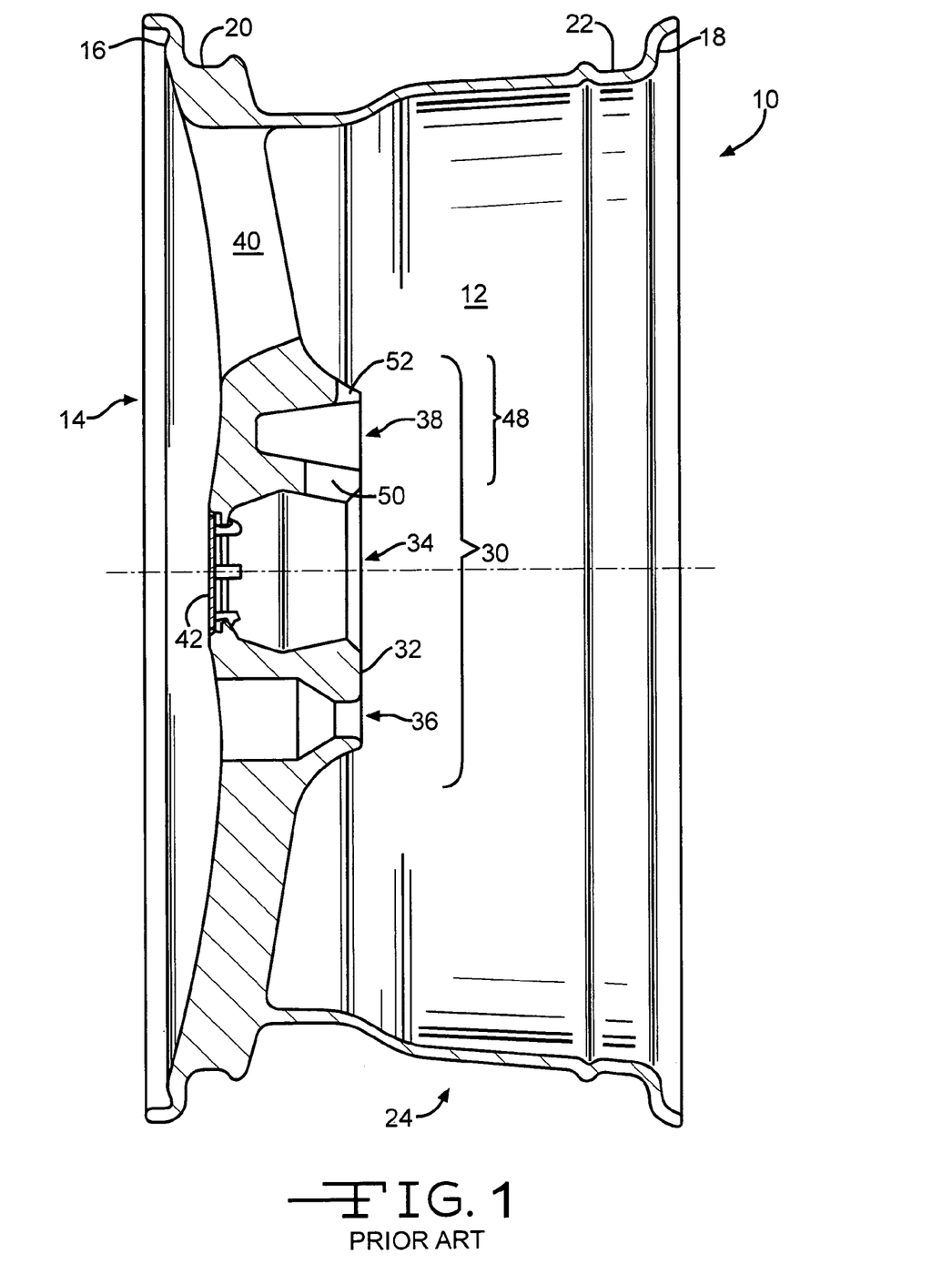
FIG. 1 is a sectional view of a typical known one piece vehicle wheel.

Referring now to the drawings, FIG. 1 illustrates a typical one piece vehicle wheel 10. The vehicle wheel 10 can be cast or forged from an aluminum alloy to produce a wheel casting or forging having physical dimensions that are close to the desired final wheel dimensions. The casting is then machined to the desired final dimensions. The vehicle wheel 10 includes an annular wheel rim 12 and a circular wheel disc 14. The wheel disc 14 can be formed across the outboard end of the wheel rim 12, as shown in FIG. 1, or recessed within the wheel rim.

The wheel rim 12 is adapted to carry a pneumatically inflated tire and has outboard and inboard tire retaining flanges 16 and 18, respectively, formed on the ends thereof that extend in an outward radial direction to retain the tire upon the wheel. Outboard and inboard tire bead seats 20 and 22, respectively, are formed on the outer surface of the wheel rim 12 adjacent to the corresponding tire retaining flange to support the tire wall beads (not shown) and form an air-tight seal therewith. The wheel rim 12 also includes a reduced diameter deep well 24 between the tire bead seats 20 and 22 to facilitate mounting the tire upon the wheel.

The wheel disc 14 includes a central wheel hub 30 for mounting the wheel 10 upon a vehicle. The inboard face 32 of the wheel disc hub is typically machined to form a flat surface to assure good contact between the wheel disc and a vehicle axle hub. A pilot hole 34 and a plurality of wheel stud holes 36 extend through the wheel hub 30. The pilot hole 34 is centered upon the hub 30 while the wheel stud holes 36 are spaced equally about a bolt hole circle that is concentric with the pilot hole 34. The pilot hole 34 can receive the end of an axle while the wheel stud holes 36 receive wheel studs (not shown) for attaching the wheel 10 to the vehicle. As shown in FIG. 1, a plurality of lightener pockets 38 extend axially into the inboard face 32 of the wheel hub 30. The lightener pockets 38 further reduce the weight of wheel and are spaced between the wheel stud holes 36. The wheel disc 14 also typically includes a plurality of wheel spokes 40 which extend radially from the wheel hub 30 to the wheel rim 14 and support the hub within the rim.

Figure 2:
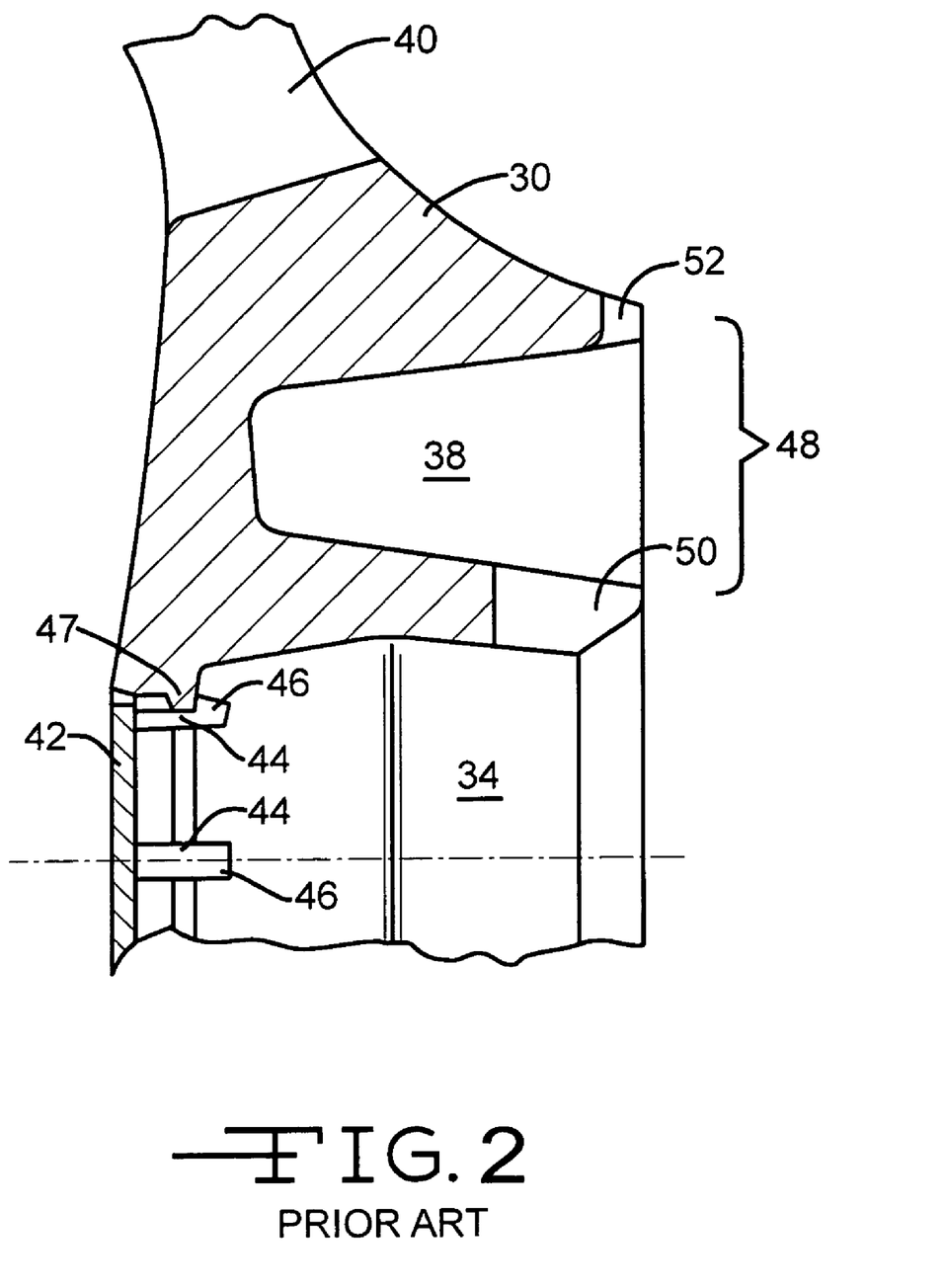
FIG. 2 is an enlarged fragmentary sectional view of a portion of the vehicle wheel hub shown in FIG. 1.

A pilot hole cover 42 extends over the outboard end of the wheel hub 30. As shown in FIG. 2, a plurality of tabs 44 (two shown) extend into the pilot hole 34. A barb 46 formed upon the end of each tab 46 cooperates with a flange 47 formed upon the pilot hole wall to frictionally secure the cover 42 to the wheel hub 30. Such covers 42 are typically formed from plastic and provide a pleasing esthetic appearance for the wheel hub center. While the cover 42 shown in the figures is recessed into the outboard end of the pilot hole 34, covers may also rest against the outboard surface of the wheel hub 30 (not shown). While either type of cover appears to be fit closely with the wheel hub and pilot hole 34, the covers do not actually form a seal with the wheel hub surface. Accordingly, water has been known to seep between the cover 42 and the wheel hub surface and enter the pilot hole 34 when the vehicle is driven through a car wash or puddles. When the water contacts a steel grease cap that extends from the axle hub into the pilot hole, galvanic action may result. If the galvanic action occurs over a period of time, the resulting corrosion may make removal of the wheel from the vehicle difficult. Additionally, during cornering maneuvers of the vehicle, rusty water may be forced from the pilot hole, staining the outboard wheel face.

As best seen in FIG. 2, it is known to form a radially extending drain slot 48 in the inboard surface of the wheel hub 32 of the wheel hub 30. As illustrated in FIG. 2, the drain slot 48 includes a inner drain slot 50, which is typically about 16 mm deep, extending from the pilot hole 34 to the lightener pocket 38, and an outer drain slot 52 extending from the lightener pocket 38 to the edge of the wheel hub 30. As the vehicle is driven, centrifugal forces urge any water present within the pilot hole 34 through the drain slot 48 and out of the center of the wheel hub 30.

It is known to form pilot hole drain slots 48 by casting or machining. With the casting method, the wheel mold is modified to include a pair of drain slot cores to form the inner and outer drain slots 50 and 52, respectively. However, the provision of a drain slot core for forming the inner drain slot 50 requires a reduction in diameter of the mold riser positioned over the center of the wheel hub, which, in turn, reduces the amount of molten metal available to compensate for shrinkage as the wheel casting cools. The inventors have found that the wheel reject rate increases to an unacceptable level when the inner drain slot 50 is cast into the wheel disc hub. Alternately, the inner drain slot 50 may be milled into the inboard surface of the wheel hub. However, milling requires a substantial amount of machining time, especially if multiple drain slots are provided. The additional machining time and the associated wear on the milling cutters increases manufacturing costs. Accordingly, a different drain slot that would reduce reject rates and/or manufacturing costs would be desirable.

BRIEF SUMMARY OF THE INVENTION

This invention relates to cast vehicle wheels having a pilot hole communicating with a milled drain slot.

The present invention contemplates a vehicle wheel having an annular rim with a wheel disc formed across the outboard end of the rim. The wheel disc includes a central wheel hub that is supported within the rim by a plurality of radially extending spokes. The wheel hub includes an inboard surface and has a pilot hole extending through the center thereof. The wheel also has at least one shallow drain slot, not more than five mm deep, formed in the inboard wheel hub surface extending radially from the pilot hole to an edge of the wheel hub. In preferred embodiment, the drain slot is about one mm deep and between 11 and 13 mm wide and extends axially into the pilot hole.

The present invention also contemplates a method for forming a drain slot in the surface of a vehicle wheel hub. The method includes casting a vehicle wheel. The wheel casting is machined to final shape. During the machining, a shallow drain slot is milled into the inboard surface of the wheel hub extending from the hub pilot hole to the edge of the hub.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
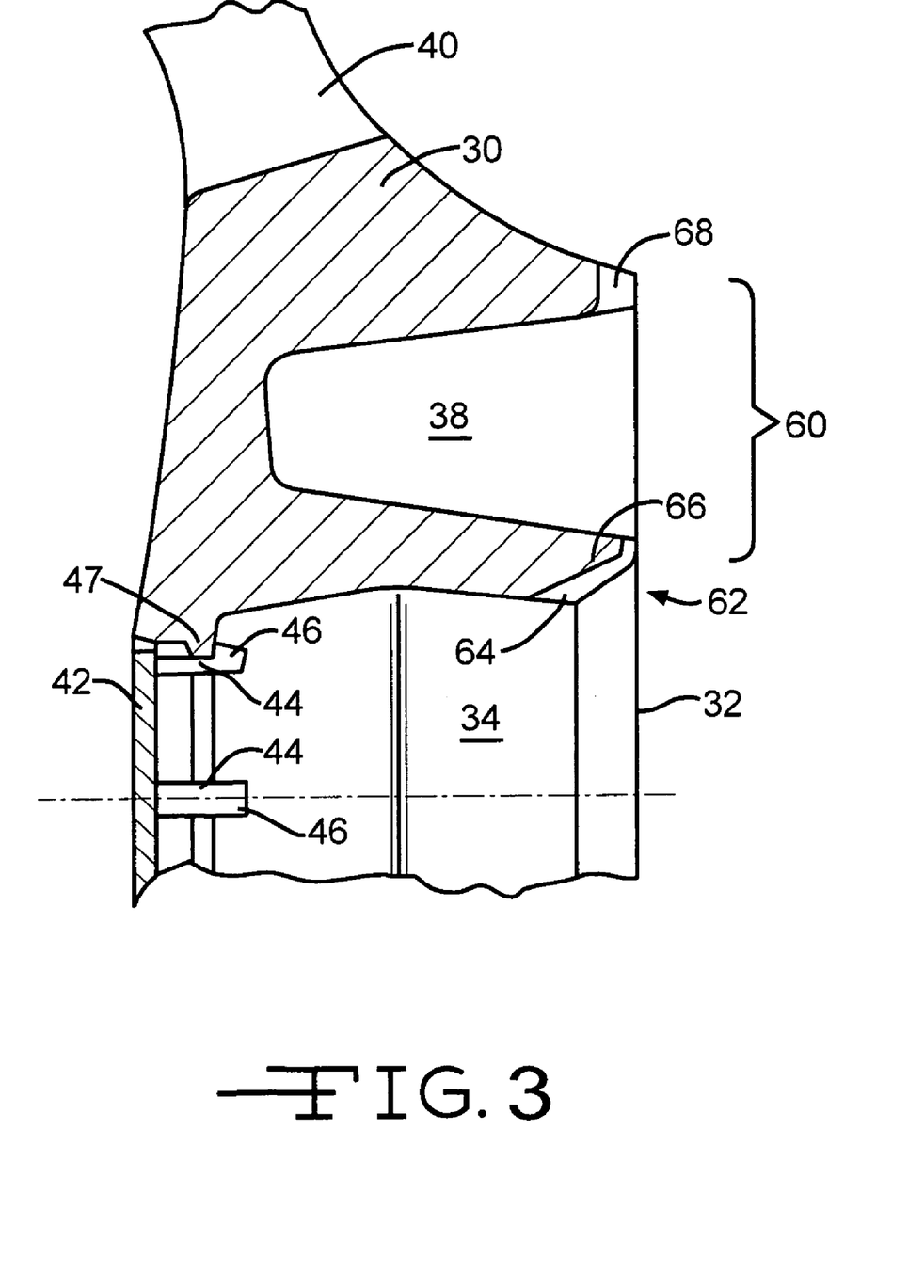
FIG. 3 is an enlarged fragmentary sectional view of a portion of a vehicle wheel hub that includes a drain slot that is in accordance with the invention.

Referring again to the drawings, there is illustrated in FIG. 3 an improved drain slot 60 in accordance with the invention. Components shown in FIG. 3 that are similar to components shown in FIG. 2 have the same numerical identifiers. The present invention contemplates milling a shallow inner drain slot 62 into the inboard surface 32 of the wheel hub 30. The inner drain slot 62 includes a first portion 64 of variable depth that extends axially into the pilot hole 32. The bottom surface of the first portion 64 extends diagonally across the inboard end of the pilot hole wall. The radially outer end of the first portion 64 terminates at the inner end of a second portion 66 that extends radially across the inboard hub surface 32 to the lightener pocket 38. In the preferred embodiment, the drain slot 62 is between 11 and 13 mm wide; however, the invention also contemplates different widths. The invention contemplates that the depth of both the first and second portions 64 and 66 of the drain slot 62 are not more than 5 mm deep. More desirably, the portions are not more than 3 mm deep and in the preferred embodiment, the first and second portions are not more than one mm deep. In all cases, the drain slot second portion 66 has a constant depth. However, the invention also contemplates different depths than those presented above, provided the slot is shallow. Thus, as compared to the prior art drain slot 50, the improved drain slot 60 has an inner portion that is significantly shallower. As a result, both machining time and mill cutter wear are significantly reduced. Because the inner slot 62 is machined, it is not necessary to modify the wheel mold. Therefore, the diameter of the mold riser positioned over the center of the wheel hub is not changed with a resulting reduction in the wheel reject rate. Additionally, because the inner slot 62 is shallow, excessive cutter wear is avoided. Accordingly, the inventors have found that the improved milled drain slot has resulted in significant manufacturing cost savings.

Figure 4:
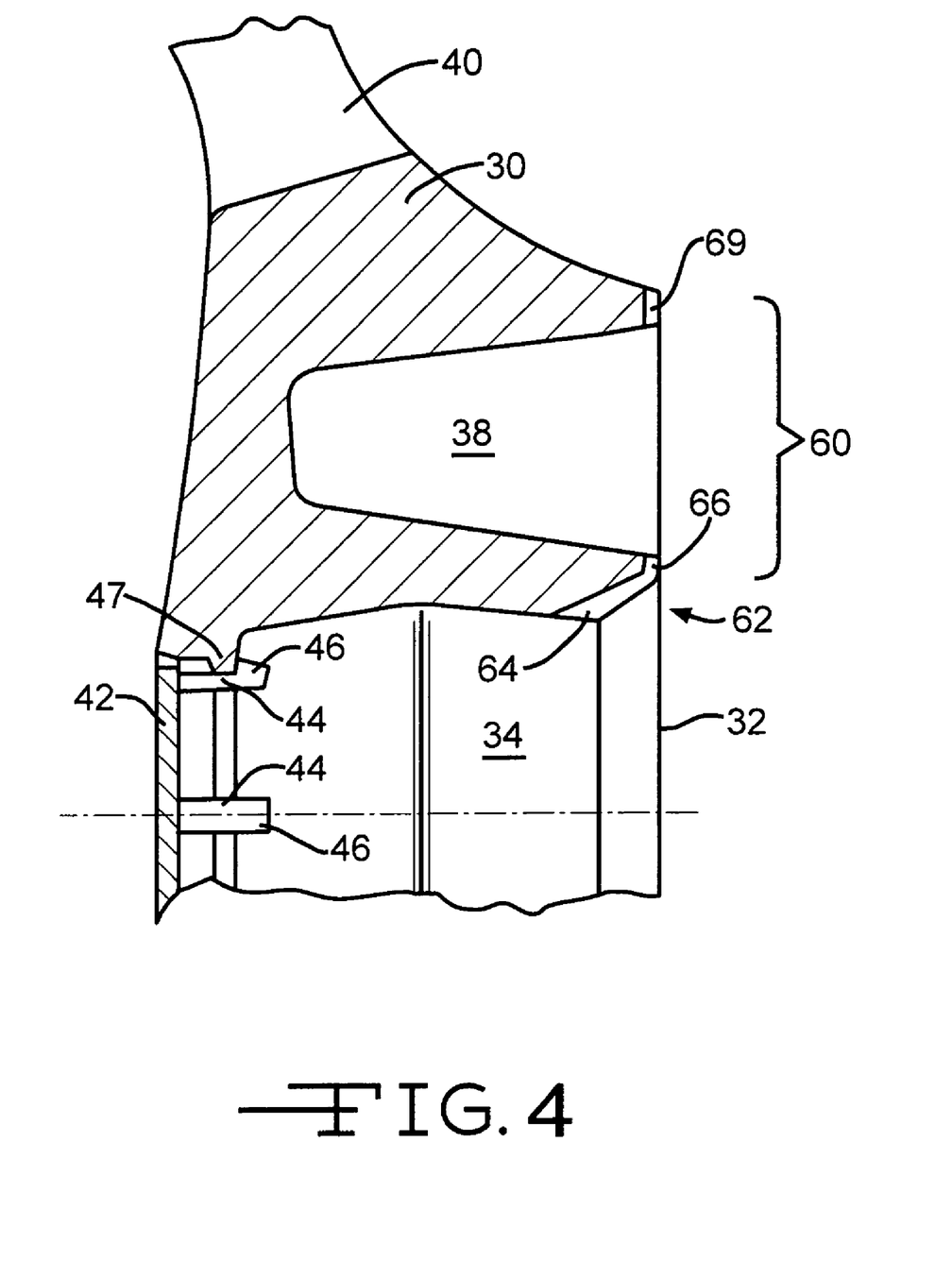
FIG. 4 is a fragmentary sectional view of an alternate embodiment of the drain slot shown in FIG. 3.

The invention also contemplate that the improved drain slot 60 includes an outer drain slot 68 that extends from the lightener pocket 38 to the edge of the wheel hub 30. Because the outer drain slot 68 is formed beyond the mold riser, positioned over the center of the wheel hub, the invention contemplates providing a core upon the mold to form the outer drain slot 68 when the wheel is cast, as illustrated in FIG. 3. Alternately, as shown in FIG. 4, an outer drain slot 69 may be milled when the inner drain slot 62 is formed. If the outer drain slot 69 is milled, it would have the same constant depth as the second portion 66 of the inner drain slot 62, such that machining time would be minimized.

While one drain slot 60 is shown in FIG. 3, the invention also contemplates forming a plurality of drain slots spaced equally about the circumference of the inboard wheel hub surface 32. Thus, if two drain slots are formed, they would be spaced 180° apart. Similarly, three drain slots would be spaced 120° apart while four drain slots would be spaced 90° apart.

Figure 5:
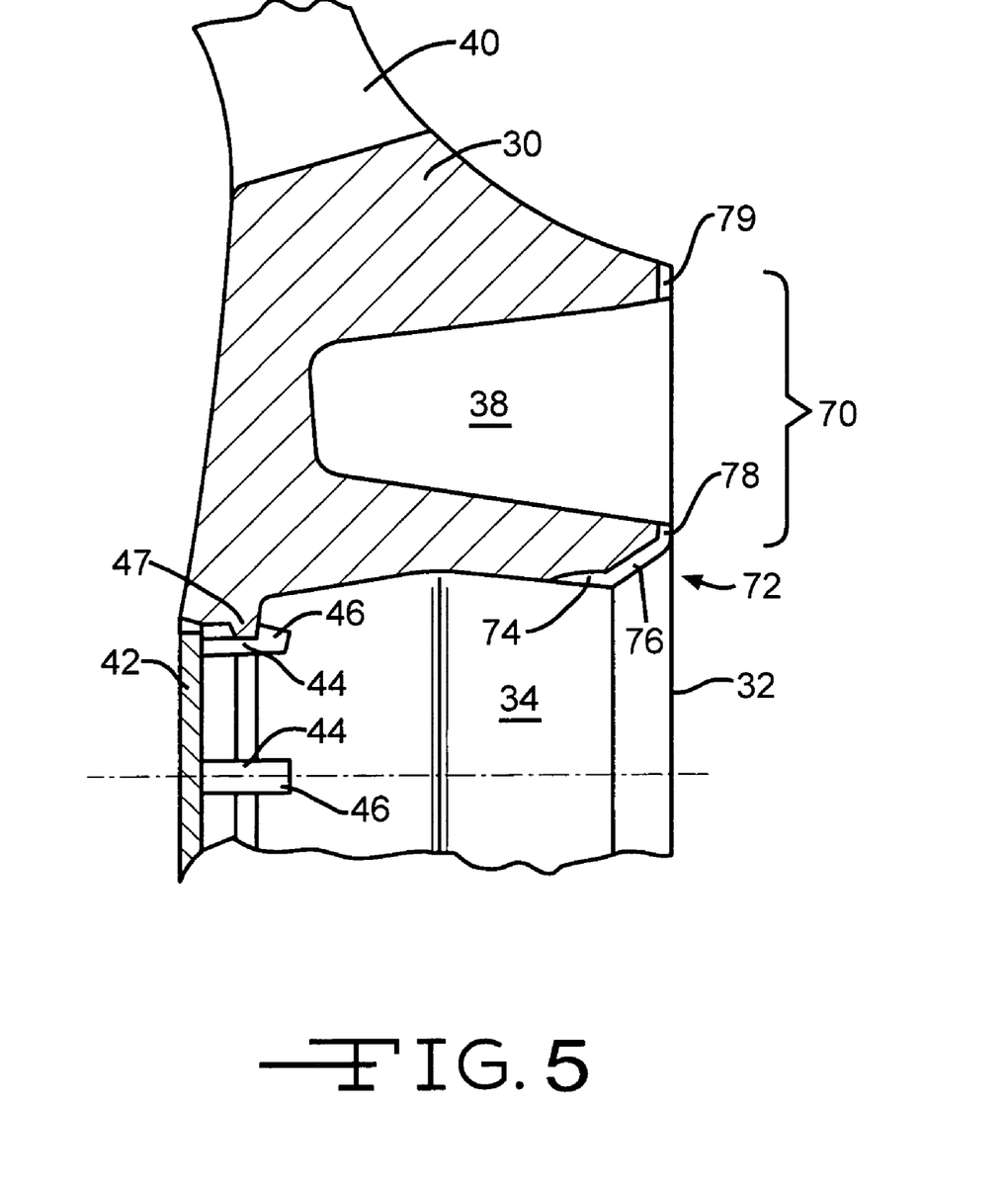
FIG. 5 is a fragmentary sectional view of another alternate embodiment of the drain slot shown in FIG. 3.

An alternate embodiment 70 of the improved drain slot is shown in FIG. 5 where components that are similar to components shown in the preceding Figs. have the same numerical identifiers. As shown in FIG. 5, the drain slot 70 includes an inner drain slot 72 that follows the shape of pilot hole wall. The inner drain slot includes a first portion 74 that extends axially along the pilot hole wall with a bottom surface that extends at an angle relative to the wheel axis from the pilot hole wall surface to the drain slot depth, which is are not more than 5 mm deep. More desirably, the depth is not more than 3 mm deep and in the preferred embodiment, the depth is not more than one mm deep. Alternately, the first portion 74 has a constant depth with a bottom surface that follows the contour of the pilot hole wall (not shown). It will be appreciated that other depths also may be used, as long as the slot is maintained at a shallow depth. The inner slot 72 also includes an intermediate portion 76 that has a constant depth as stated above and that extends between the end of the first portion 74 and a third portion 78 with the depth as stated above. The third portion 78 also has a constant depth as stated above and extends radially across the inboard hub surface 32 to the lightener pocket 38. In the preferred embodiment, the drain slot 72 is between 11 and 13 mm wide; however, the invention also contemplates different widths.

As also shown in FIG. 5, the drain slot 70 further includes an outer drain slot 79 that extends across the inboard surface 32 of the wheel hub 30 from the lightener pocket 38 to the edge of the wheel hub 30. As shown in FIG. 5, the outer drain slot 79 is milled at the same time as the inner drain slot 72 and to the same dimensions. Alternately, the outer drain slot may be cast into the inboard surface 32 of the wheel hub 30 (not shown) as described above. As also described above, the present invention contemplates forming one or more of the drain slots 70 in the wheel hub.

Figure 6:
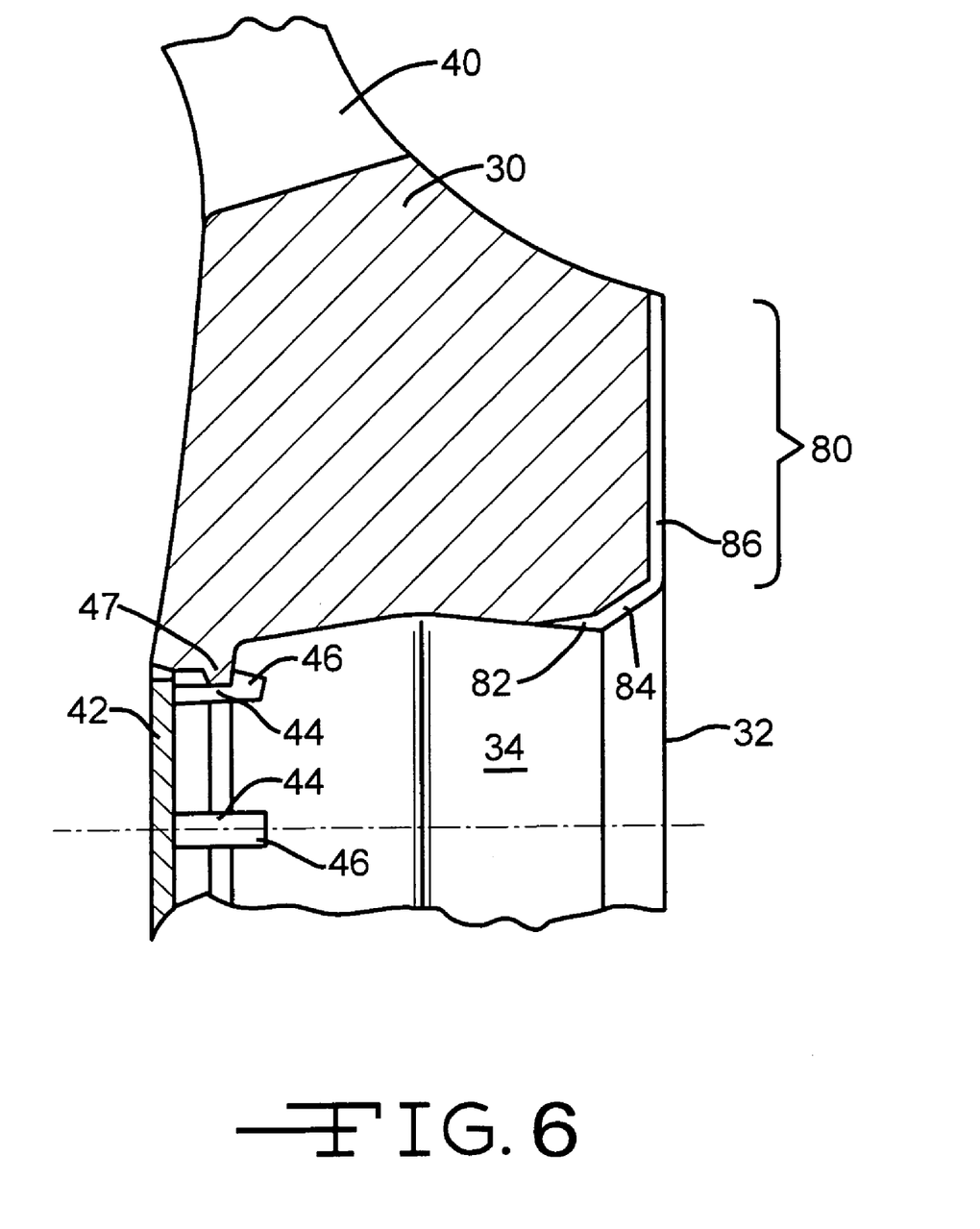
FIG. 6 is a fragmentary sectional view of another alternate embodiment of the drain slot shown in FIG. 3.

Another alternate embodiment 80 of the improved drain slot for a wheel that does not have lightener pockets is shown in FIG. 6 where components that are similar to components shown in the preceding Figs. have the same numerical identifiers. As shown in FIG. 5, the drain slot 80 follows the contour of the pilot hole wall as described for the embodiment shown in FIG. 5 and extends across the inboard surface 32 of the wheel hub 30 from the pilot hole 34 to the edge of the wheel hub 30. The drain slot 80 includes a first portion 82 that extends axially along the pilot hole wall with a bottom surface that extends at an angle relative to the wheel axis from pilot hole wall surface to the drain slot depth, which is are not more than 5 mm deep. More desirably, the depth is not more than 3 mm deep and in the preferred embodiment, the depth is not more than one mm deep. Alternately, the first portion 74 has a constant depth with a bottom surface that follows the contour of the pilot hole wall (not shown). It will be appreciated that other depths also may be used, as long as the slot is maintained at a shallow depth. The drain slot 80 also includes an intermediate portion 84 having a constant depth as stated above that extends between the end of the first portion 82 and a third portion 86. The third portion also has a constant depth as stated above and extends radially across the inboard hub surface 32 to the edge of the wheel hub 30. In the preferred embodiment, the drain slot 72 is between 11 and 13 mm wide; however, the invention also contemplates different widths.

While the preferred embodiment of the drain slot 80 is shown as being milled across the inboard hub surface, it will be appreciated that the radially outer portion of the third portion 86 also may be cast into the wheel hub surface 32, as described above. Then the milled third portion 86 would extend from the intermediate portion 84 only to the cast portion (not shown). Casting a portion of the slot would reduce both the machining time required and milling head wear. As also described above, the present invention contemplates forming one or more of the drain slots 80 in the wheel hub.

The present invention also contemplates a method for forming a drain slot in a wheel vehicle wheel hub. The method is illustrated by the flow chart shown in FIG. 7. In functional block 90 a one piece vehicle wheel is cast in a wheel mold by a conventional method, such as gravity or low pressure casting. Once the wheel casting has solidified and cooled sufficiently, the casting is removed from the wheel mold and machined to a final shape in functional block 92. After machining, the wheel is mounted in a milling machine in functional block 94 with the inboard surface of the wheel hub facing the milling cutter. Then, in functional block 96, a drain slot is milled in a radial direction across the inboard wheel hub surface from the pilot hole to the edge of the wheel hub. As described above, in the preferred embodiment, the drain slot would be about one mm deep and 11 to 13 mm wide; however, the slot also may have other dimensions. The milling would be computer controlled and the slot would extend into the pilot hole wall in an axial direction. Upon completion of milling the drain slot, the wheel would be removed from the milling machine in functional block 98.

Figure 7:
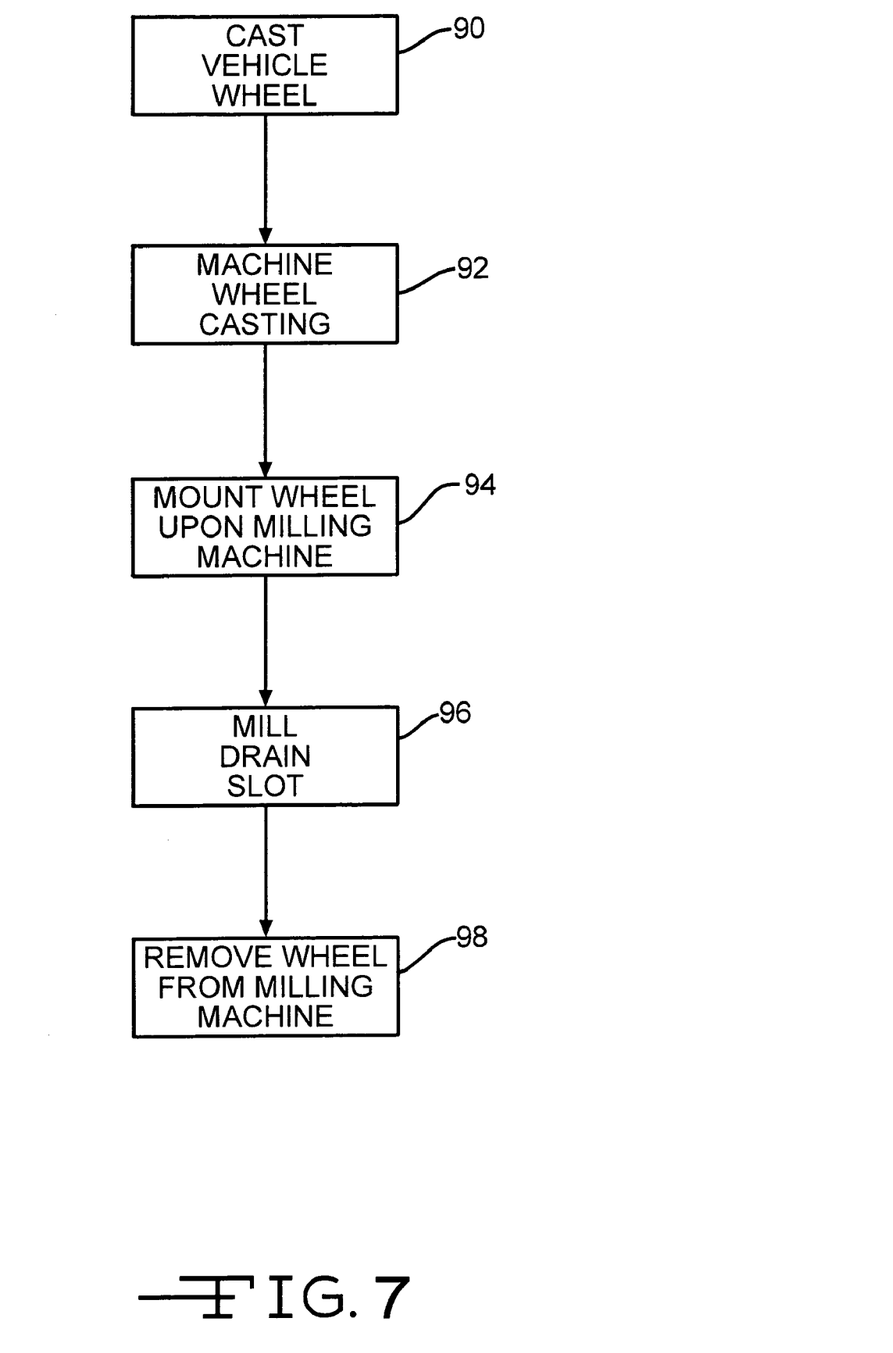
FIG. 7 is a flow chart for a method for forming a drain slot in a vehicle wheel hub surface that is in accordance with the invention.

It will be appreciated that the flow chart shown in FIG. 7 is exemplary of the method and that the invention also may be practiced with variations from the steps shown in FIG. 7. For example, if the inboard wheel hub were milled instead of being faced, the milling of the drain slot may also be combined with milling the hub inboard surface in functional block 92, in which case functional blocks 94 through 98 would be omitted.

Alternately, the drain slot also may be milled while wheel is mounted upon the machining station that drills the lug holes through the hub and a valve stem hole through the outboard end of the wheel rim (not shown).

While the preferred embodiment of the invention has been illustrated and described above for a one piece wheel, it will be appreciated that the method also may be practiced for other types of wheels. For example, the invention also may be practiced upon a two piece wheel having a cast full face wheel disc that includes an outboard tire bead seat attached to the outboard end of a partial wheel rim. For such a wheel the drain slot would be milled into the inboard surface of the wheel disc hub before the wheel disc is attached to the partial wheel rim. The invention also contemplates that the drain slot can be milled into the inboard surface of a wheel spyder that is subsequently mounted within a full wheel rim.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle wheel comprising:
an annular wheel rim having an outboard end;
a wheel disc formed across said outboard end of said wheel rim, said wheel disc including a central wheel hub supported within said rim by a plurality of radially extending spokes, said hub having an inboard surface;
a pilot hole extending through the center of said wheel disc; and
at least one shallow drain slot formed in said inboard wheel hub surface extending from said pilot hole to an edge of said wheel hub, said drain slot including a first portion that extends axially into said pilot hole along the wall of said pilot hole, said drain slot also including a second portion that extends from an end of said first portion of said drain slot in a radial direction across said inboard wheel hub surface.

2. The wheel according to claim 1 wherein said drain slot is not more than five mm deep.

3. The wheel according to claim 2 wherein said drain slot is not more than three mm deep.

4. The wheel according to claim 3 wherein said drain slot is not more than one mm deep.

5. The wheel according to claim 3 wherein said first portion of said drain slot includes a base and further wherein said first portion base is generally parallel to the wall of said pilot hole.

6. The wheel according to claim 5 wherein said drain slot has a constant depth.

7. The wheel according to claim 5 wherein said drain slot is milled into said wheel hub surface.

8. The wheel according to claim 5 wherein a plurality of shallow drain slots are formed in said inboard wheel hub surface extending in a radial direction from said pilot hole to an edge of said wheel hub.

9. The wheel according to claim 5 wherein said wheel hub has at least one lightener pocket formed therein extending axially into said hub from said inboard surface and further wherein said drain slot includes a first portion extending across said inboard wheel hub surface from said pilot hole to said lightener pocket and a second portion extending across said inboard wheel hub surface from said lightener pocket to the edge of said wheel hub.

10. The wheel according to claim 5 wherein said drain slot is between 11 and 13 mm wide.

11. A method for forming a vehicle wheel comprising the steps of:

(a) casting a one piece vehicle wheel, the wheel including a central wheel hub supported by a plurality of wheel spokes within an annular wheel rim, the wheel hub having a pilot hole extending axially therethrough;

(b) machining the wheel casting to a final shape; and (c) milling a shallow drain slot into the inboard surface of the wheel hub, said drain slot including a first portion that extends axially into the pilot hole along the wall of the pilot hole, the drain slot also including a second portion that extends from an end of the first portion of the drain slot in a radial direction across the inboard wheel hub surface.

12. The method according to claim 11 wherein the drain slot milled in step (c) is not more than five mm deep.

13. The method according to claim 12 wherein the first portion of the drain slot includes a base and further wherein the first portion base is generally parallel to the wall of the pilot hole surface.

14. The method according to claim 13 wherein the drain slot has a constant depth.

15. The method according to claim 13 wherein a plurality of drain slots are milled in step (c).

16. The method according to claim 13 wherein the drain slot is from 11 to 13 mm wide.

17. The method according to claim 13 wherein the drain slot has a depth of not more than one mm.

* * * * *